United States Patent [19]

Kellett et al.

[11] Patent Number: 4,693,949
[45] Date of Patent: Sep. 15, 1987

[54] STORAGE BATTERY HOUSING

[75] Inventors: James H. Kellett; Raymond W. Gaddis, both of Winston-Salem; Robert W. Fritts, Thomasville, all of N.C.; David L. Schoenecker, Anaheim, Calif.

[73] Assignee: Douglas Battery Manufacturing Co., Winston-Salem, N.C.

[21] Appl. No.: 764,385

[22] Filed: Aug. 12, 1985

[51] Int. Cl.$^4$ .................. H01M 2/02; H01M 2/04
[52] U.S. Cl. .................................. 429/178; 429/122; 429/175; 429/176; 429/179
[58] Field of Search ............... 429/176, 175, 178, 179, 429/121, 122

[56] References Cited

U.S. PATENT DOCUMENTS

| 3,488,698 | 1/1970 | Quick, Jr. ................. 429/175 X |
| 3,770,511 | 11/1973 | Winterbottom et al. ....... 429/121 X |
| 3,871,924 | 3/1975 | DeMattie et al. ........... 429/176 |
| 4,350,746 | 9/1982 | Chambers .................. 429/121 |
| 4,435,486 | 3/1984 | Pomaro et al. ............. 429/176 X |
| 4,460,663 | 7/1984 | Stutzbach et al. .......... 429/176 X |

Primary Examiner—Brian E. Hearn
Assistant Examiner—Stephen J. Kalafut
Attorney, Agent, or Firm—Charles R. Rhodes; Judith E. Garmon

[57] ABSTRACT

The container or casing of a storage battery for automobiles and the like is so constructed as to be universally compatible for use with various types of securing mechanisms. Positive and negative terminals are provided on both the top and on one of the side walls. The battery may be secured by a peripheral frame which engages the periphery of the top wall, a central bail which overlies the medial portion of the top wall, or lower opposed clips which engage and clamp onto ledges on opposed side walls or opposed end walls. The top wall and bottom wall are so constructed as to nest to the adjacent housing in a stack when stored or displayed, and a space between adjacent housings allows visual inspection of a color coded handle. In addition, a unique vent cover construction elevates the wells surrounding the vent openings to maximize the vertical dimension of the plates therebeneath.

7 Claims, 7 Drawing Figures

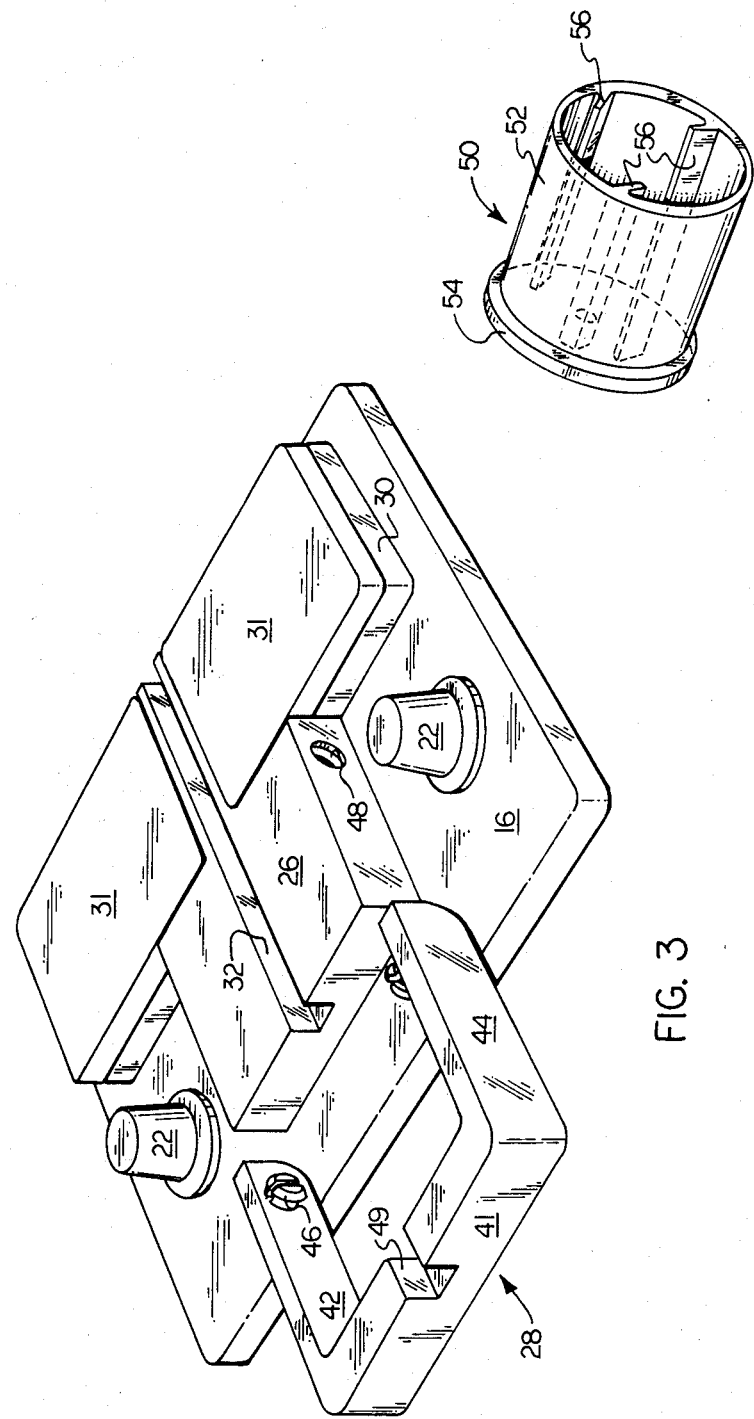

STORAGE BATTERY HOUSING

BACKGROUND AND SUMMARY OF THE PRESENT INVENTION

This invention is directed to storage batteries for automobiles, boats, golf carts, and the like. More particularly, it is directed to a unique container or housing for such storage batteries wherein a single container is compatible with various types of securing devices, and thus may be used in a large percentage (approximately 80%) of all makes of automobiles.

The automobile industry has never adopted standardized battery containers. As a result, even though most automobile electrical systems utilize 12-volt batteries, such batteries appear in various housing configurations. Some containers position the terminals on the top wall and some on the side walls. Different manufacturers of vehicles utilize different securing devices. For example, some vehicles utilize a peripheral frame around the top wall which clamps down on around the edge of upper surface. Other vehicles utilize a wire bail or a ribbed plastic or metal strap which overlies the top wall. Other approaches utilize hold down clips which grasp ledges that protrude from opposed side walls or opposed end walls near or adjacent the lower portions thereof and thus secure the battery at such points.

Heretofore, different containers have been manufactured for the different types of hold down devices. In the case of a manufacturer who constructs batteries for a single automobile manufacturer, this approach is satisfactory; however, in the case of the manufacturer who is manufacturing batteries for many different types of automobiles, a significant problem exists in manufacturing several different types of containers for basically the same interior plate arrangement. Further, it is expensive for retailers to inventory several different battery configurations to serve the needs of all customers.

Another problem encountered in previous containers is related to the venting structure for the individual cells. As presently arranged, each cell includes a vent opening or port in the top wall of the housing directly above the cell to allow relief of gas pressure. Each vent opening is provided with a cylindrical wall or "well" extending down into the interior of the container from the top wall. This cylindrical wall prevents the chemicals therein from splashing out through the port, and therefore must be relatively long (approximately ¾ inch). The length of the wall extending downwardly from the top wall is a limiting factor for the vertical dimension of the plates. The plates cannot be of a height which would extend above the plane formed by the lower extremity of the aforesaid cylindrical walls. Therefore, the cylindrical wall becomes a limiting factor as to the electrical storage capacity of the battery.

The battery container according to the present invention is designed to overcome the above problems and provide a single battery housing that is compatible with a large percentage of securing devices presently in use. Toward this end, a first set of positive and negative terminal posts are provided on the top wall of the housing and second set of positive and negative terminal posts are provided on one of the side walls. Interiorly, both terminals are connected to the plates so that either set of terminals may be selectively utilized, while the other set remains covered.

The top wall of the battery housing according to the present invention includes several superstructures extending upwardly therefrom such as terminal posts, a handle support pad, and a pair of vent bases through which the vent openings extend. A marginal area of the top wall surrounding the aforesaid superstructures is free of any upstanding structure whereby a peripheral frame type clamp may be used as a hold down means. The aforesaid handle support pad includes a recess or groove extending therethrough between the vent bases for the receipt of a bail wire or ribbed plastic or metal strap. Finally, each of the side walls and end walls include outwardly extending ledges adjacent the bottom walls thereof to provide a gripping surface thereof for hold down clamps or brackets adjacent opposed side walls or opposed end walls.

Additional features of the present battery housing include a handle which snaps into the handle support base and is pivotal between a folded down, storage position, and an upwardly disposed carrying position. The handle is color coded and provided with a front surface on the end thereof stamped to designate the type of battery attached thereto. The top wall and lower wall of each housing is further so constructed as to permit nesting of adjacent batteries in a stack with a slight space therebetween for storage or display purposes. Thus, when stacked, one may look between adjacent housings at the color or otherwise coded handle to determine the type of battery at any position in the stack. Both sets of terminals are provided with protective caps thereover, since only two of the four terminals are to be used, and it is advisable to cover the remaining two terminals. A unique protective cap is provided for the protruding type of upper terminals, which cap includes interior resilient splines extending into contact with the peripheral surface of the terminal to provide a tighter grip thereon and prevent inadvertent removal. The side terminals are provided with flat snap-in caps.

As a result of the elevation of the vent opening base above the top wall surface, the lower extremity of the cylindrical wall surrounding the vent openings is at an elevated position in the interior compartment. Thus, the vertical dimension of the lead plates therein may be increased providing an increased plate surface.

It is therefore an object of the present invention to provide a universal battery housing.

It is another object of the present invention to provide a battery housing of the type described in which a single housing may be utilized to hold batteries in a variety of vehicles that utilize different securing and connecting devices.

Still another object of the present invention is to provide a battery housing that provides for plate dimensions of increased size therein.

Other objects and a fuller understanding of the invention will become apparent from reading the following detailed description of a preferred embodiment, along with the accompanying drawings in which:

FIG. 3 is an exploded perspective view of the handle construction and mounting pad therefor;

FIG. 4 is a perspective view illustrating the protective cap for the top terminals;

DETAILED DESCRIPTION OF A PREFERRED EMBODIMENT

Figure 1:
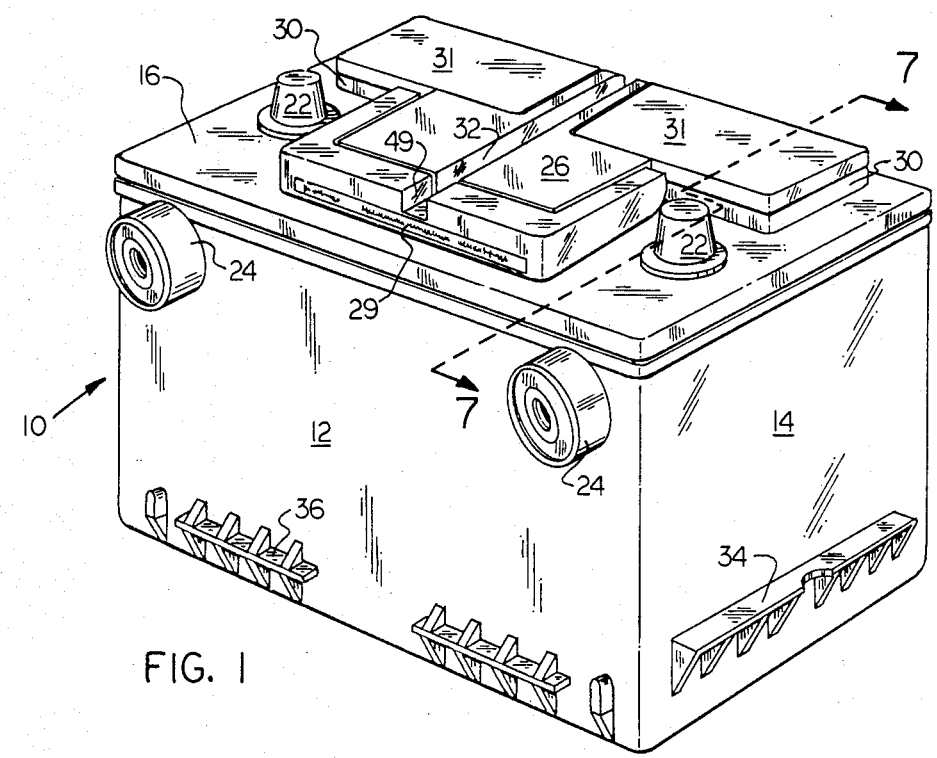
FIG. 1 is a perspective view of the battery housing according to the present invention looking at the top and a pair of adjacent side and end walls.
Figure 2:
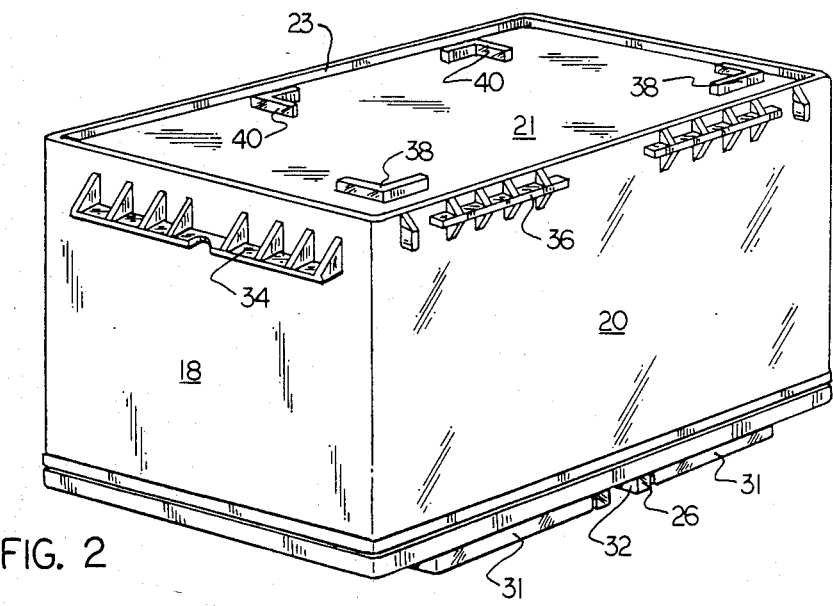
FIG. 2 is a perspective view looking at the underside of the battery housing of FIG. 1.

Turning now to the drawings, and first of all to FIGS. 1 and 2, there is illustrated the unique battery housing or container 10 which is the subject of the present invention. Housing 10 includes a pair of opposed side walls 12,20 and end walls 14,18; a top cover 16; and a bottom wall 21. To this point, there has merely been described an open top, rectangular container with a top cover. Cover or top wall 16 is sealed to the upper edge of side walls 12,20 and end walls 14,18 upon final assembly of the battery at the manufacturing site. Within the housing are arranged a plurality of spaced alternately arranged, positive and negative lead plates. The plates of one cell are interconnected and connected to the terminals according to well known and conventional techniques. Other than the fact that the plates are connected to both sets of terminals 22,24, there is nothing unique about the plate construction and arrangement.

One feature, which was necessary to make the battery housing compatible with a greater variety of frames and connecting arrangements, was to provide for a first set of positive and negative terminals 22 on the cover 16 as well as a second set of terminals 24 on one of the side walls 12. This feature, in and of itself, is not novel, as a battery having terminals on both the top and side has been marketed for several years. A T-shaped handle support pad or block 26 is raised from surface of top wall 16 to provide a support structure for handle 28 which is pivotally attached thereto as will be described hereinafter. The handle support pad 26 is generally a T-shaped block. Handle 28 is formed of a colored plastic material provided with a stamped front surface 29 of identifying indicia. This color, indicia, or stamped front surface 29 advises the retailer and customer as to the type of battery being purchased, whether it be a twelve month, twenty-four month, thirty-six month, forty-eight month, sixty month, or lifetime battery.

A pair of generally rectangular base members 30 through which vent openings extend are molded into the cover and raised upwardly from the surface thereof on either side of the elongated leg of the T-shaped handle support pads 26. The vent opening bases 30 are approximately one-half the height of the handle support pad 26. A plurality of openings or ports (generally three in number) extend through each base member 30 to communicate with the interior cells as will be hereinafter described. Each base member 30 is provided with a cap 31 having a plurality of downwardly extending, cylindrical, protruding vents for insertion into each of the openings therein in a well known manner. The combined vertical dimensions of the cap 31 and its associated base member 30 is approximately equal to the corresponding dimension of the handle support pad 26. Also, the thickness dimension of handle 28 is approximately equal to the vertical dimension of handle support pad 26 and the combined vertical dimensions of vent opening base 30 and its cap 31. Thus, when the caps 31 are assembled and the handle 28 is folded down, all of the surfaces are substantially coplanar approximately ¾ to ⅞ inch above the surface 16 of the top wall.

A groove 32 extends through the elongated leg of the T-shaped handle support pad 26, and a similarly shaped groove 49 extends through the cross member 41 of handle 28 as illustrated in FIGS. 1 and 3. This groove or recess 32,49 is provided for receiving a wire bail or other securing device (not shown) which is used in certain types of batteries to encircle the upper surface of the battery, extending down over either side wall thereof to some type of clamp or fastening screw therebelow. It should also be noted that the top cover 16 includes a peripheral or marginal portion free of any of the aforesaid structures such as the terminal 22, the handle 28, the handle mounting pad 26, or the vent opening pad 30. This peripheral margin is provided so that a rectangular frame-type securing down system, used on certain types of automobiles, may be implemented.

Each end wall 14,18 is provided with outwardly protruding ledges 34. Similarly, the opposed side walls 12,20 are provided with protruding ledge members 36. Ledges 34,36 are for the purpose of forming a gripping surface for hold down clips or brackets near the bottom wall of the housing 10, which are the type of securing devices utilized in certain types of automobiles.

Turning now to FIG. 2, there is illustrated the underside or bottom wall 21 of the housing 10. A peripheral rim or edge 23 having a vertical dimension of approximately one-sixteenth inch is provided encircling the periphery of the bottom wall. L-shaped nesting brackets 38,40 also having a vertical dimension of approximately one-sixteenth inch, are provided on the undersurface 21 which register with the exterior corners of the event caps 30 and the handle 28 when a plurality of battery housings are stacked. So arranged, when one battery is set atop another, there is a slight overlap or nesting result, which tends to stabilize a stack of batteries. Since the height of the structures 30,31,26, and 28 on the top wall is approximately ¾ to ⅞ inch, there is visual access to the coding means (indicia strip 29) therebetween. Thus, even though the batteries are stacked, a customer, attendant, or warehouseman can still determine the type of any battery in the stack by visually inspecting the handle in the space between adjacent battery housings 10.

In FIG. 3, there is illustrated the manner in which the handle 28 is attached to the handle mounting pad 26. Toward this end, the handle 28 includes a cross member 41 and a pair of depending attachment arms 42,44. Each attachment arm 42,44 includes a snap-on retaining member 46 at the lower extremity thereof which fits into a receiving port or recess 48 in the sides of pad 26. The handle is made of such material that the arms 42,44 are sufficiently resilient to allow the ends to spread sufficiently to snap into the receiving openings 48, yet when assembled, are sufficiently strong and sturdy to resist inadvertent removal.

Figure 5:
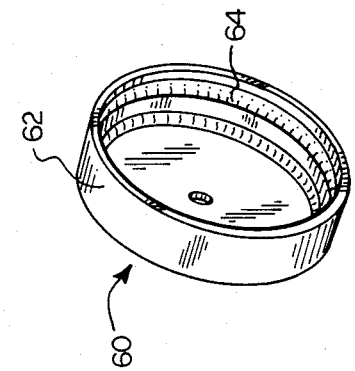
FIG. 5 is a perspective view illustrating the protective cap for the side terminals.

FIG. 4 is illustrative of a unique design for a protective safety cap 50 for mounting over the terminals 22 on the top wall. Toward this end, each safety cap 50 includes a cylindrical wall 52 slightly larger than the periphery of terminals 22, and an enlarged annular handle portion 54 for facilitating the placement and removal thereof. The interior of cylindrical wall 52 is provided with a plurality of elongated inclined teeth or splines 56 extending inwardly and at an angle from the inner surface of the wall 52. These teeth 56 are molded integrally with the protective cap. Because of the inclination, the teeth 56 are resilient, so that the cap 50 may be easily emplaced on the terminal, yet resists movement in the opposite direction tending to remove the cap therefrom. FIG. 5 is illustrative of a safety cap 60 for the side wall terminals 24 and merely includes a rim 62 having a bulbous portion 64 protruding therefrom which resiliently snaps around the terminal opening.

Figure 6:
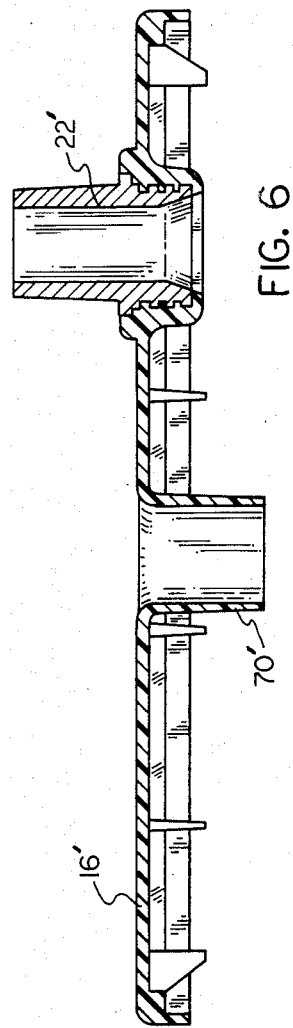
FIG. 6 is a sectional view through a representative top wall of a prior art construction illustrating the venting arrangement.
Figure 7:
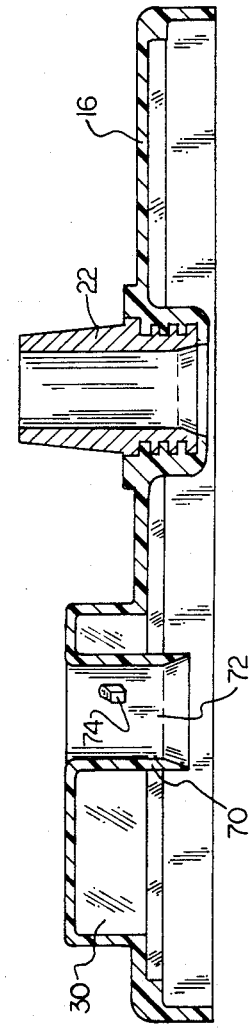
FIG. 7 is a sectional view through the top wall of the housing of the present invention with the vent cover and terminal protective cap removed.

Turning now to FIG. 7, there is illustrated a cross-sectional view of the cover member 16 and the manner in which the present invention has provided for increased space in the compartment beneath the cover for increasing the vertical dimension of the lead plates thereunder. As previously stated, the base members 30 through which the vent openings are raised from the surface of top wall 16 a distance approximately equal to three-eighths inch. A plurality of passageways or openings 72 extend through the upper surface of base members 30, there being one passageway or port 72 for each cell of the battery. The cylindrical wall or well 70 which surrounds each port 72 extends downwardly from the periphery of the opening to prevent spillage of the chemicals therein. It has been determined that the length of this wall or well should be approximately three-quarters to seven-eighths of an inch. A pair of locking tabs 74 are molded into and extend outwardly from the inner surface of wall 70 for engagement in openings in the cylindrical protruding vents of the vent caps (not shown). By reference to FIG. 6, which illustrates the prior art embodiments, where the vent openings extend through the normal top wall, the cylindrical wall or well 70' must still be approximately three-quarters of an inch in length and extends downwardly into the interior of the battery compartment much further than in the approach of the present invention. By way of comparison, a conventional terminal is shown on the right hand side of FIG. 6 and FIG. 7. In the approach of the present invention, the base of the terminal 22 becomes the limiting factor as far as the vertical dimension of the lead plates thereunder is concerned, whereas in the approach in FIG. 6, the bottom periphery of the wall or well 70' was the limiting factor and extended a considerable distance beneath the base of terminal 22.

While a preferred embodiment of the present invention has been described in detail hereinabove, it is apparent that various changes and modifications might be made without departing from the scope of the invention which is set forth in the claims below.

What is claimed is:

1. A universal battery container or housing for storage batteries of the type used in automobiles, boats, and the like, and in which a plurality of horizontally spaced, lead plates are contained and electrically connected through the battery container to exterior terminals, said container comprising:
   (a) side walls, end walls, a top wall, and a bottom wall forming said container and in which said plates are arranged;
   (b) a first set of positive and negative exterior terminal posts on said top wall and a second set of positive and negative exterior terminal posts on one of said side walls so arranged that said first and second sets are selectively electrically connected to said plates;
   (c) said top wall including, in addition to said terminal posts, a handle support pad raised or upstanding from the surface thereof in the area of said top wall intermediate said terminal posts, said handle support pad including means associated therewith for pivotally attaching a handle thereto, the marginal area of said top surface being free of any upstanding structure around the periphery thereof, thereby adapting the battery container to be clamped down by a peripheral frametype clamp;
   (d) said handle support pad including a recessed groove therethrough for the receipt of a looped securing member therethrough which extends up alongside said side walls and across said top wall from side wall to side wall;
   (e) each of said side walls and each of said end walls include an outwardly protruding ledge member adjacent the bottom wall, said ledge being of such size and configuration as to be selectively securely engaged by lower hold down clips or brackets which engage in some cases the ledges of the lower end walls and in some cases the ledges of the lower side walls and are provided as the battery securing device by some automobiles and boats.

2. The housing according to claim 1 and further including an inverted U-shaped handle comprising a cross member and a pair of attachment arms, means associated with said attachment arms for pivotally attaching said handle to said handle support pad whereby said handle may be pivoted between a first position extending generally upwardly from said top wall carrying said battery housing and a second position folded down flush with the plane formed by the upper surface of said handle support pad, said cross member comprising a recessed groove aligned with the groove in said handle support pad when in said second position.

3. The battery housing according to claim 2 whereby said handle includes identifying indicia on the outer edge surface of said cross member, said indicia comprising a color code.

4. The battery housing according to claim 3 and further including at least one vent opening base member raised from the surface of said top wall and provided with a cover, the vertical dimensions of said vent opening base member and cover and the thickness dimension of said handle being substantially the same so as to form a planar support base for the overlying battery when batteries are stacked, a nesting means interconnecting the bottom wall of one battery with the corners of said handle and vent covers of the underlying battery when a plurality of batteries are stacked, said nesting means comprising a plurality of L-shaped brackets secured to said bottom wall, said brackets being arranged in such a pattern as to register with the outermost corners of said handle and said vent covers.

5. The battery housing according to claim 1 and further including a pair of vent opening base members raised from the surface of said top wall and including a plurality of vent openings therein, a cylindrical wall surrounding each of said vent openings and extending downwardly therefrom into the interior of said housing, whereby the lower edge of said cylindrical walls is caused to be at a greater height dimension from the bottom wall, so that the height dimension of the lead plates therein may be increased.

6. The battery housing according to claim 1 and further including removable terminal caps for each of said top wall terminal posts and side wall terminal posts, whereby the unused terminal posts may be selectively covered when not in use.

7. The battery housing according to claim 6 wherein the removable terminal caps include a cylindrical wall, and means associated with said interior surface of the cylindrical wall for effecting an interference fit with the adjacent battery terminal.

* * * * *